United States Patent
Unoki et al.

(10) Patent No.: US 11,322,751 B2
(45) Date of Patent: May 3, 2022

(54) METHOD FOR PRODUCING CATALYST FOR AIR SECONDARY BATTERY, METHOD FOR PRODUCING AIR SECONDARY BATTERY, CATALYST FOR AIR SECONDARY BATTERY, AND AIR SECONDARY BATTERY

(71) Applicant: FDK CORPORATION, Tokyo (JP)

(72) Inventors: Shohei Unoki, Tokyo (JP); Takeshi Kajiwara, Tokyo (JP); Takahiro Endo, Tokyo (JP); Shigekazu Yasuoka, Tokyo (JP); Yoshikatsu Watanabe, Yamagata (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 16/981,275

(22) PCT Filed: Mar. 25, 2019

(86) PCT No.: PCT/JP2019/012567
§ 371 (c)(1),
(2) Date: Sep. 15, 2020

(87) PCT Pub. No.: WO2019/189014
PCT Pub. Date: Oct. 3, 2019

(65) Prior Publication Data
US 2021/0043945 A1    Feb. 11, 2021

(30) Foreign Application Priority Data

Mar. 30, 2018    (JP) .............................. JP2018-066454

(51) Int. Cl.
*H01M 4/90*        (2006.01)
*H01M 4/38*        (2006.01)
(Continued)

(52) U.S. Cl.
CPC ....... *H01M 4/9016* (2013.01); *B01J 23/6447* (2013.01); *B01J 37/06* (2013.01);
(Continued)

(58) Field of Classification Search
None
See application file for complete search history.

(56) References Cited

U.S. PATENT DOCUMENTS

| 4,129,525 A | 12/1978 | Horowitz et al. |
| 4,203,871 A | 5/1980 | Horowitz et al. |
| 2014/0083971 A1 | 3/2014 | Fujii et al. |

FOREIGN PATENT DOCUMENTS

| CN | 102214827 A | 10/2011 |
| JP | 2007119900 A | 5/2007 |

(Continued)

OTHER PUBLICATIONS

Foelske et al., "Electrochemically pretreated Bi2Pt2-ylryO7 pyrochlores—an X-ray photoelectron spectroscopy study", Surface and Interface Analysis 38 (1), 2006, 210-214.*
(Continued)

*Primary Examiner* — Jonathan Crepeau
(74) *Attorney, Agent, or Firm* — Kinney & Lange, P.A.

(57) ABSTRACT

A battery includes an electrode group including an air electrode and a negative electrode stacked with a separator therebetween, and an accommodating bag accommodating the electrode group along with an alkali electrolyte solution. The air electrode includes a catalyst for an air secondary battery. This catalyst for an air secondary battery is produced by a method for producing a catalyst for an air secondary battery, the method including a precursor preparation step of preparing a bismuth-ruthenium oxide precursor, a calcination step of calcining the bismuth-ruthenium oxide precursor obtained in this precursor preparation step to form a bis-
(Continued)

muth-ruthenium oxide, and a nitric acid treatment step of immersing the bismuth-ruthenium oxide obtained by this calcination step in a nitric acid aqueous solution.

13 Claims, 4 Drawing Sheets

(51) Int. Cl.
*H01M 4/88* (2006.01)
*H01M 12/08* (2006.01)
*B01J 23/644* (2006.01)
*B01J 37/06* (2006.01)
*H01M 4/02* (2006.01)
*H01M 4/86* (2006.01)

(52) U.S. Cl.
CPC ......... *H01M 4/383* (2013.01); *H01M 4/8878* (2013.01); *H01M 12/08* (2013.01); *H01M 2004/027* (2013.01); *H01M 2004/8689* (2013.01)

(56) References Cited

FOREIGN PATENT DOCUMENTS

| JP | 20090272231 A | 11/2009 |
|---|---|---|
| JP | 2014220111 A | 11/2014 |
| JP | 2016152068 A | 8/2016 |
| JP | 2017063020 A | 3/2017 |
| JP | 2017112112 A | 6/2017 |
| KR | 20160150009 | * 12/2016 |

OTHER PUBLICATIONS

Machine translation of JP 2016-152068, Aug. 2016.*
International Search Report and Written Opinion dated Jun. 18, 2019 for corresponding PCT Application No. PCT/JP2019/012567.
Extended European Search Report dated Dec. 3, 2021, received for European Application No. 19775557.2, 11 pages.
H.S. Horowitz, New Oxide Pyrochlores: A2{~ [B2-xAx]07-y,Mat. Res. Bull., vol. 16, pp. 489-496, 1981, USA.
A. Kahoul, P. Nkeng, A. Hammouche, F. Naamoune, and G. Poierat, A Sol-Gel Route for the Synthesis of Bi2Ru2O7 Pyrochlore Oxide for Oxygen Reaction in Alkaline Medium, Journal of Solid State Chemistry 161, pp. 379-384, 2001.

* cited by examiner

METHOD FOR PRODUCING CATALYST FOR AIR SECONDARY BATTERY, METHOD FOR PRODUCING AIR SECONDARY BATTERY, CATALYST FOR AIR SECONDARY BATTERY, AND AIR SECONDARY BATTERY

CROSS-REFERENCE TO RELATED APPLICATION(S)

This application is the national phase of PCT Application No. PCT/JP2019/012567 filed on Mar. 25, 2019, which in turn claims priority to Japanese Application No. 2018-066454 filed on Mar. 30, 2018, both of which are incorporated by reference herein in their entireties.

BACKGROUND

Technical Field

The present disclosure relates to a method for producing a catalyst for an air secondary battery, a method for producing an air secondary battery, a catalyst for an air secondary battery, and an air secondary battery.

BACKGROUND ART

Air secondary batteries, which use oxygen in air as the positive electrode active material, have attracted attention recently as high-efficient and clean energy conversion devices.

Among these, air hydrogen secondary batteries, in which an alkaline aqueous solution (alkali electrolyte solution) is used as the electrolyte solution and which includes, as the negative electrode, a hydrogen storage alloy capable of absorbing and releasing hydrogen as the negative electrode active material, have advantages described below, and thus are expected to be next-generation secondary batteries.

First, an air hydrogen secondary battery, in which oxygen in air is used as the positive electrode active material, does not require to reserve space for storing the positive electrode active material therein. Eliminating this space has an advantage of saving the space for the battery correspondingly. Alternatively, in the case where this space is not eliminated but utilized for storing a hydrogen storage alloy, the battery capacity of the air hydrogen secondary battery depends only on the capacity of the negative electrode, and thus, there is an advantage of enhancing the capacity in accordance with the increase in the amount of the hydrogen storage alloy. In other words, such an air hydrogen secondary battery may achieve a higher energy density than that of a nickel hydrogen secondary battery, which also employs a hydrogen storage alloy.

In an air secondary battery in which an alkali electrolyte solution is used as in the air hydrogen secondary battery described above, a charge and discharge reaction shown below occurs in the air electrode.

Discharge: $O_2 + 2H_2O + 4e^- \rightarrow 4OH^-$     (I)

Charge: $4OH^- \rightarrow O_2 + 2H_2O + 4e^-$     (II)

The air electrode in the air hydrogen secondary battery reduces oxygen to produce hydroxide ions on discharging, as represented by the reaction formula (I) and produces oxygen and water on charging, as represented by the reaction formula (II). Oxygen generated in the air electrode is released into the atmosphere from the portion open to the atmosphere in the air electrode.

In the air electrode, which is the positive electrode of the air hydrogen secondary battery as described above, a pyrochlore-type oxide is used as a catalyst. Examples of this pyrochlore-type oxide include transition element oxides. For example, a bismuth-ruthenium oxide is known, as disclosed in Patent Document 1. This bismuth-ruthenium oxide, which has catalytic activity on oxygen generation and oxygen reduction, is used in the positive electrode of an air hydrogen secondary battery.

This bismuth-ruthenium oxide is produced by a production method in which a precursor is produced by a coprecipitation method by use of bismuth nitrate and ruthenium chloride as the starting material and thereafter the precursor is calcined, for example.

PRIOR ART DOCUMENT

Patent Document

Patent Document 1: Japanese Patent Laid-Open No. 2016-152068

SUMMARY

In the method for producing the bismuth-ruthenium oxide described above, by-products are formed in the process thereof. When an air electrode is produced with a catalyst including by-products mixed therein, and charge and discharge cycles are performed on an air hydrogen secondary battery including the air electrode, the bismuth-ruthenium oxide itself does not cause a dissolution and precipitation reaction, but the by-products described above cause the dissolution and precipitation reaction. Particularly, the dissolution and precipitation reaction of the metal components (principally bismuth) in the by-products is repeated due to a chemical reaction on charging and discharging in the battery (hereinbelow, referred to as a battery reaction), and so-called dendritic growth occurs, in which the metal components are dendritically precipitated on the electrode plates. When the metal components thus dendritically grow, the metal components extend into the separator and penetrate the separator in the end. As a result, micro short-circuiting problematically occurs. When the micro short-circuiting thus occurs, there is not only ion conductivity via the electrolyte, but also electron conductivity, between the positive electrode and the negative electrode inside the battery. In the case where electron conductivity exists, the battery is self-discharging. The dendritic growth of the metal components increases in accordance with the charge and discharge cycle. Thus, the amount self-discharged increases as the charge and discharge cycle proceeds. As a result, the discharge capacity of the battery decreases with a relatively small number of cycles, and the battery life is expired in the early stage.

For this reason, it is demanded to develop an air secondary battery that is unlikely to be subjected to decrease in the discharge capacity than before and has a stable discharge capacity, even when charging and discharging are repeated.

The present disclosure has been achieved in view of the above-described circumstances, and it is an object thereof to provide a method for producing a catalyst for an air secondary battery, a method for producing an air secondary battery, a catalyst for an air secondary battery, and an air secondary battery that are capable of preventing occurrence of micro short-circuiting.

In order to achieve the object described above, according to the present disclosure, there is provided a method for producing a catalyst for an air secondary battery for use in the air electrode of the air secondary battery, the method including a precursor preparation step of preparing a pyrochlore-type oxide precursor, a calcination step of calcining the precursor to form a pyrochlore-type oxide, and an acid treatment step of immersing the pyrochlore-type oxide obtained from the calcination step in an acidic aqueous solution to apply an acid treatment.

The pyrochlore-type oxide is preferably constituted as a pyrochlore-type transition element oxide having a composition represented by the general formula: $A_{2-x}B_{2-y}O_{7-z}$, wherein x, y, and z each represent a numerical value of 0 or more and 1 or less, A represents at least one element selected from Bi, Pb, Tb, La, Ce, Pr, Nd, Pm, Sm, Eu, Gd, Dy, Ho, Er, Tm, Yb, Lu, Mn, Y, and Zn, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo.

The acidic aqueous solution is preferably constituted as any of a nitric acid aqueous solution, a hydrochloric acid aqueous solution, and a sulfuric acid aqueous solution.

The pyrochlore-type transition element oxide is preferably constituted as a pyrochlore-type bismuth-ruthenium oxide.

The pyrochlore-type transition element oxide is preferably constituted to be subjected to the acid treatment such that, when X represents the amount of bismuth contained in the bismuth-ruthenium oxide and Y represents the amount of ruthenium contained in the bismuth-ruthenium oxide, the value of X/Y, which is the ratio of the amount of bismuth to the amount of ruthenium, is 0.90 or less.

The pyrochlore-type transition element oxide is preferably constituted to be subjected to the acid treatment such that the value of X/Y, which is the ratio of the amount of bismuth to the amount of ruthenium, is 0.80 or more.

According to the present disclosure, there is also provided a method for producing an air secondary battery, including an air electrode production step of allowing an air electrode substrate to carry an air electrode mixture including a catalyst for an air secondary battery to produce an air electrode, a negative electrode production step of allowing a negative electrode substrate to carry a negative electrode mixture to produce a negative electrode, an electrode group formation step of stacking the air electrode on the negative electrode with a separator therebetween to form an electrode group, and an accommodation step of accommodating the electrode group along with an alkali electrolyte solution into a container, wherein the catalyst for an air secondary battery is produced by the method for producing a catalyst for an air secondary battery according to any of those described above.

The negative electrode production step is preferably constituted to further include a process of allowing the negative electrode mixture to contain a hydrogen storage alloy.

According to the present disclosure, there is also provided a catalyst for an air secondary battery for use in the air electrode of the air secondary battery, the catalyst for an air secondary battery including a pyrochlore-type oxide that has been subjected to an acid treatment of immersion in an acidic aqueous solution and from which by-products generated in the production process have been removed.

The pyrochlore-type oxide is preferably constituted as a pyrochlore-type transition element oxide having a composition represented by the general formula: $A_{2-x}B_{2-y}O_{7-z}$, wherein x, y, and z each represent a numerical value of 0 or more and 1 or less, A represents at least one element selected from Bi, Pb, Tb, La, Ce, Pr, Nd, Pm, Sm, Eu, Gd, Dy, Ho, Er, Tm, Yb, Lu, Mn, Y, and Zn, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo.

The pyrochlore-type transition element oxide is preferably constituted as a bismuth-ruthenium oxide.

The bismuth-ruthenium oxide is preferably constituted such that, when X represents the amount of bismuth contained in the bismuth-ruthenium oxide and Y represents the amount of ruthenium contained in the bismuth-ruthenium oxide, the value of X/Y, which is the ratio of the amount of bismuth to the amount of ruthenium, is 0.90 or less.

The bismuth-ruthenium oxide is preferably constituted such that the value of X/Y, which is the ratio of the amount of bismuth to the amount of ruthenium, is 0.80 or more.

According to the present disclosure, there is also provided an air secondary battery including an electrode group including an air electrode and a negative electrode stacked with a separator therebetween and a container accommodating the electrode group along with an alkali electrolyte, wherein the air electrode includes any of the catalysts for an air secondary battery described above.

The negative electrode is preferably constituted to include a hydrogen storage alloy.

The method for producing a catalyst for an air secondary battery according to the present disclosure includes an acid treatment step of immersing the pyrochlore-type oxide in an acid aqueous solution to apply an acid treatment. Subjecting the oxide to this acid treatment step enables removal of by-products of the pyrochlore-type oxide to thereby prevent dendrites from occurring due to a dissolution and precipitation reaction of the metal components in the by-products. Thus, according to the present disclosure, it is possible to provide a method for producing a catalyst for an air secondary battery capable of preventing occurrence of micro short-circuiting.

DETAILED DESCRIPTION

Hereinbelow, an air hydrogen secondary battery (hereinbelow, simply referred to as the battery) 2 incorporating an air electrode including a catalyst for an air secondary battery according to the present disclosure will be described with reference to the drawings.

Figure 1:
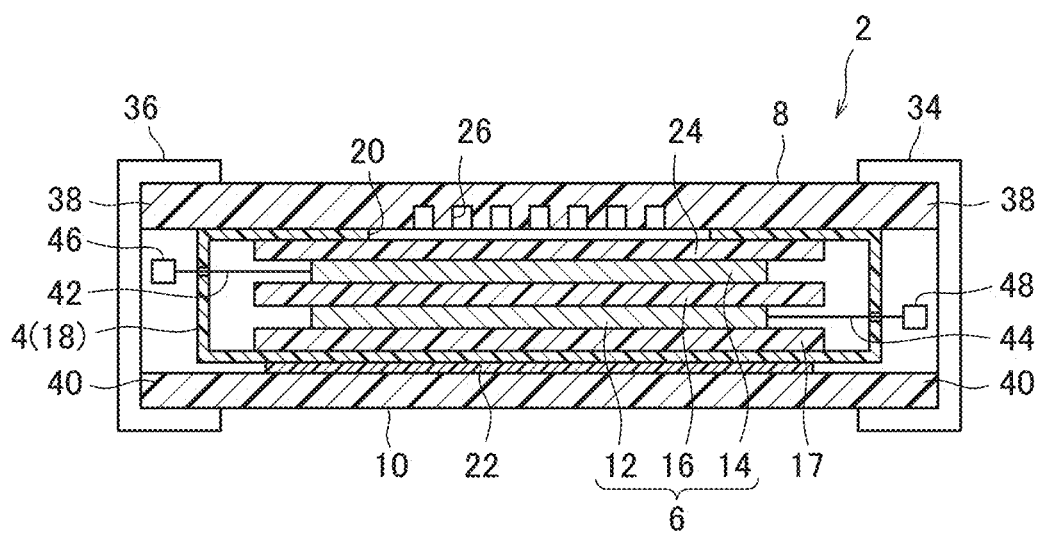
FIG. 1 is a cross-sectional view schematically illustrating an air hydrogen secondary battery according to one embodiment of the present disclosure.

As shown in FIG. 1, the battery 2 is formed by sandwiching an electrode group 6 accommodated in a container 4 between a top plate 8 and a bottom plate 10.

The electrode group 6 is formed by stacking an air electrode (positive electrode) 14 on a negative electrode 12 with a separator 16 therebetween.

The negative electrode 12 includes a conductive negative electrode substrate that forms a porous structure and has a large number of pores and a negative electrode mixture supported inside the pores and the surface of the negative electrode substrate.

As such a negative electrode substrate, foam nickel can be used, for example.

A negative electrode mixture includes a hydrogen storage alloy powder, which is an assembly of hydrogen storage alloy particles that can absorb and release hydrogen, as a negative electrode active agent, a conductive material, and a binder. Here, as the conductive agent, graphite, carbon black, or the like can be used.

As the hydrogen storage alloy constituting the hydrogen storage alloy particles, which is not particularly limited, a rare earth-Mg—Ni-based hydrogen storage alloy is used. The composition of this rare earth-Mg—Ni-based hydrogen storage alloy can be optionally selected. For example, one represented by the general formula:

$$Ln_{1-x}Mg_xNi_{y-a-b}Al_aM_b \qquad (III)$$

is preferably used.

In general formula (III), Ln represents at least one element selected from the group consisting of La, Ce, Pr, Nd, Pm, Sm, Eu, Gd, Tb, Dy, Ho, Er, Tm, Yb, Lu, Sc, Y, Zr, and Ti, M represents at least one element selected from the group consisting of V, Nb, Ta, Cr, Mo, Mn, Fe, Co, Ga, Zn, Sn, In, Cu, Si, P, and B, subscripts a, b, x, and y respectively represent a number satisfying $0.05 \leq a \leq 0.30$, $0 \leq b \leq 0.50$, $0.01 \leq x \leq 0.30$, $2.8 \leq y \leq 3.9$.

Hydrogen storage alloy particles are obtained as follows, for example.

First, the metal raw materials are weighed and mixed to achieve a predetermined composition. This mixture is dissolved under an inert gas atmosphere in a high-frequency induction melting furnace, for example, to form an ingot. The ingot obtained is heated to 900 to 1200° C. under an inert gas atmosphere. The ingot is subjected to a thermal treatment at this temperature for 5 to 24 hours and thus homogenized. Thereafter, this ingot is pulverized and sieved to thereby obtain a hydrogen storage alloy powder, which is an assembly of hydrogen storage alloy particles having a desired particle size.

Examples of a binder to be used include sodium polyacrylate, carboxymethyl cellulose, and styrene butadiene rubber.

The negative electrode 12 here can be produced as follows, for example.

First, a hydrogen storage alloy powder, which is an assembly of hydrogen storage alloy particles, a conductive agent, a binder, and water are kneaded to prepare a negative electrode mixture paste. The negative electrode mixture paste obtained is packed into a negative electrode substrate and then dried. After drying, the negative electrode substrate having the hydrogen storage alloy particles and the like attached thereto is rolled to increase the alloy content per volume. Thereafter, the rolled substrate is cut to thereby produce the negative electrode 12. This negative electrode 12 is in a plate form as a whole.

Next, the air electrode 14 includes a conductive air electrode substrate that forms a porous structure and has a large number of pores and an air electrode mixture (positive electrode mixture) carried inside the pores and the surface of the air electrode substrate.

As such an air electrode substrate, foam nickel or nickel mesh can be used, for example.

The air electrode mixture includes a catalyst for an air secondary battery, a conductive agent, and a binder.

As the catalyst for an air secondary battery, used is a pyrochlore-type oxide subjected to an acid treatment of immersion in an acidic aqueous solution. Here, as the pyrochlore-type oxide to be subjected to the acid treatment, it is preferable to use a pyrochlore-type transition element oxide having a composition represented by the general formula: $A_{2-x}B_{2-y}O_{7-z}$, wherein x, y, and z each represent a numerical value of 0 or more and 1 or less, A represents at least one element selected from Bi, Pb, Tb, La, Ce, Pr, Nd, Pm, Sm, Eu, Gd, Dy, Ho, Er, Tm, Yb, Lu, Mn, Y, and Zn, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo. More preferably, a bismuth-ruthenium oxide is used. This bismuth-ruthenium oxide, which has binary catalytic activity of oxygen generation and oxygen reduction, has a pyrochlore-type structure.

The catalyst for an air secondary battery is produced as follows.

First, a pyrochlore-type bismuth-ruthenium oxide is prepared. The preparation is specifically as follows.

$Bi(NO_3)_3 \cdot 5H_2O$ and $RuCl_3 \cdot 3H_2O$ were introduced at the same concentration into distilled water and stirred to prepare a mixed aqueous solution of $Bi(NO_3)_3 \cdot 5H_2O$ and $RuCl_3 \cdot 3H_2O$. The temperature of the distilled water at this time is set at 60° C. or more and 90° C. or less. Then, a 1 mol %/1 or more and 3 mol %/1 or less NaOH aqueous solution is added to this mixed aqueous solution. While the bath temperature at this time is maintained at 60° C. or more and 90° C. or less, the solution is stirred under oxygen bubbling. While the solution containing a precipitate generated by this operation is maintained at 80° C. or more and 100° C. or less, a portion of the moisture is evaporated to form a paste. This paste is transferred to an evaporating dish and heated to 100° C. or more and 150° C. or less. The paste is dried while maintained in the state for 10 hours or more and 20 hours or less to obtain a dried product of the paste. After pulverized in a mortar, this dried product is heated under an air atmosphere to 500° C. or more and 700° C. or less. The dried product is calcined while maintained for 0.5 hours or more and 2 hours or less to obtain a calcined product. The calcined product obtained is washed with distilled water at 60° C. or more and 90° C. or less and then dried. This results in a pyrochlore-type bismuth-ruthenium oxide.

Subsequently, the bismuth-ruthenium oxide prepared is subjected to a nitric acid treatment as the acid treatment, wherein the oxide is immersed in a nitric acid aqueous solution. The treatment is specifically as follows.

First, a nitric acid aqueous solution is provided. Here, the concentration of the nitric acid aqueous solution is preferably 1 mol %/1 or more and 3 mol %/1 or less. The amount of the nitric acid aqueous solution to be provided is preferably 40 ml per 2 g of a bismuth-ruthenium oxide. The temperature of the nitric acid aqueous solution is preferably set at 20° C. or more and 25° C. or less.

Then, in the nitric acid aqueous solution provided, the bismuth-ruthenium oxide is immersed and stirred for 10 minutes or more and 10 hours or less. After a predetermined time period elapses, the bismuth-ruthenium oxide is filtered with suction from the nitric acid aqueous solution. The bismuth-ruthenium oxide filtered is introduced in and washed with ion exchanged water set at 60° C. or more and 80° C. or less.

The washed bismuth-ruthenium oxide is maintained under a reduced pressure environment of a room temperature (25° C.) for 10 hours or more and 14 hours or less and dried. Note that, for drying the washed bismuth-ruthenium oxide, a drying condition for drying the oxide while the oxide is maintained in air under a temperature environment of 80° C. to 150° C. for one hour or more and 24 hours or less may be employed.

In the manner as mentioned above, the bismuth-ruthenium oxide subjected to the nitric acid treatment is obtained. Applying the nitric acid treatment as mentioned above enables removal of by-products generated during the production process of the pyrochlore-type oxide. Note that the acidic aqueous solution used in the acid treatment is not limited to nitric acid aqueous solutions and hydrochloric acid aqueous solution and sulfuric acid aqueous solution can be used in addition to nitric acid aqueous solutions. In these hydrochloric acid aqueous solutions and sulfuric acid aqueous solutions, an effect of enabling by-products to be removed can be provided as in the case of nitric acid aqueous solutions.

Subsequently, as the conductive agent, which is not particularly limited, for example, a nickel powder, which is an assembly of nickel particles, is preferably used.

The binder binds a redox catalyst and additionally serves to impart suitable water repellency to the air electrode 14. Here, examples of the binder include, but are not particularly limited to, fluorine resins. Note that, as a preferable fluorine resin, polytetrafluoroethylene (PTFE) is used, for example.

The air electrode 14 can be produced as follows, for example.

First, prepared is an air electrode mixture paste including a bismuth-ruthenium oxide, a binder, and water.

The air electrode mixture paste obtained is shaped into a sheet form and then is pressure-bonded by a press onto nickel mesh (an air electrode substrate). Thereby, an intermediate product for an air electrode is obtained.

The intermediate product obtained is then introduced in a calciner and subjected to a calcining treatment. This calcining treatment is carried out under an inert gas atmosphere. As this inert gas, nitrogen gas or argon gas is used, for example. As the calcining treatment conditions, the intermediate product is heated to a temperature of 300° C. or more and 400° C. or less and maintained in this state for 10 minutes or more and 20 minutes or less. Thereafter, the intermediate product is naturally cooled in the calciner and taken out in the atmosphere when the temperature of the intermediate product is lowered to 150° C. or less. Thereby, obtained is an intermediate product subjected to the calcining treatment. The air electrode 14 is obtained by cutting this intermediate product into a predetermined shape.

The air electrode 14 and the negative electrode 12 obtained as described above are stacked with the separator 16 therebetween to thereby form the electrode group 6. This separator 16 is provided to prevent short-circuiting between the air electrode 14 and the negative electrode 12, and an electrically insulating material is employed therefor. As the material employed for this separator 16, non-woven fabric of polyamide fibers to which hydrophilic functional groups are imparted, and non-woven fabric of polyolefin fibers such as polyethylene and polypropylene to which hydrophilic functional groups are imparted can be used.

The electrode group 6 formed is accommodated along with an alkali electrolyte solution into the container 4. The container 4 is not particularly limited as long as the container 4 can accommodate the electrode group 6 and the alkali electrolyte solution, and as an example thereof, a bag-shaped container made of polyethylene (hereinbelow, referred to as the accommodating bag 18) is used. In this accommodating bag 18, for example, an insertion/ejection port having a fastener (not shown) is provided in a portion thereof, and an opening 20 is provided in another portion thereof. The electrode group 6 is accommodated through the insertion/ejection port described above in the accommodating bag 18.

When the electrode group 6 is accommodated into the accommodating bag 18, carbon non-woven fabric 24 is disposed on the air electrode 14 side of the electrode group 6 so as to be in contact with the air electrode 14. This carbon non-woven fabric 24 has been subjected to a water repellent treatment with PTFE. Additionally, a separator 17 is disposed on the negative electrode 12 side of the electrode group 6 so as to be in contact with the negative electrode 12. As this separator 17, one made of the same material and having the same shape as that of separator 16 described above is used, for example.

Here, the electrode group 6 accommodated into the accommodating bag 18 is mounted on the separator 17 disposed on the negative electrode side, as shown in FIG. 1. Then, the carbon non-woven fabric 24 is disposed on the air electrode 14 of the electrode group 6. Then, only the carbon non-woven fabric 24 is exposed from the opening 20 of the accommodating bag 18.

Subsequently, the electrode group 6 accommodated into the accommodating bag 18 as described above is sandwiched between the top plate 8 and the bottom plate 10.

The top plate 8 is a plate material made of an acryl resin, having a venting passage 26 at a position opposite to the opening 20 of the accommodating bag 18, as shown in FIG. 1. This venting passage 26 entirely takes one serpentine shape, and the ends of the passage 26 are open to the atmosphere.

The bottom plate 10 is a plate material made of an acryl resin, having the same size as the top plate 8. Note that the bottom plate 10 has no venting passage.

The accommodating bag 18 accommodating the electrode group 6 therein is mounted on the bottom plate 10 with a flat negative electrode side buffer plate 22 formed of a resin interposed therebetween. Then, the top plate 8 is mounted on the accommodating bag 18 accommodating the electrode group 6. The electrode group 6 accommodated in the accommodating bag 18 is thus sandwiched vertically by the top plate 8 and the bottom plate 10. At this time, the venting passage 26 of the top plate 8 is opposite to the carbon non-woven fabric 24. The carbon non-woven fabric 24 allows gas to permeate therethrough but blocks moisture, and thus the air electrode 14 is open to the atmosphere via the carbon non-woven fabric 24 and the venting passage 26. That is, the air electrode 14 is brought into contact with the atmosphere through the carbon non-woven fabric 24.

As for the top plate 8 and the bottom plate 10 vertically sandwiching the electrode group 6 accommodated in the accommodating bag 18, the peripheral edge 38 of the top plate 8 and the peripheral edge 40 of the bottom plate 10 are clamped vertically by connectors 34 and 36, as schematically depicted in FIG. 1. The battery 2 is thus formed.

Here, in this battery 2, an air electrode lead (positive electrode lead) 42 is electrically connected to the air electrode (positive electrode) 14, and a negative electrode lead 44 is electrically connected to the negative electrode 12. The air electrode lead 42 and negative electrode lead 44, which are schematically depicted in FIG. 1, are drawn outside the accommodating bag 18 while air-tightness and water-tightness are maintained. Then, an air electrode terminal (positive electrode terminal) 46 is provided on the tip of air electrode lead 42, and a negative electrode terminal 48 is provided on the tip of the negative electrode lead 44. Accordingly, in the battery 2, these air electrode terminal 46 and negative electrode terminal 48 are used to input and output electric currents on charging and discharging.

EXAMPLES

1. Production of Battery

Example 1

(1) Catalyst Synthesis

As a first step, a predetermined amount of $Bi(NO_3)_3 \cdot 5H_2O$ and $RuCl_3 \cdot 3H_2O$ was provided. These $Bi(NO_3)_3 \cdot 5H_2O$ and $RuCl_3 \cdot 3H_2O$ were introduced at the same concentration into distilled water at 75° C. and stirred to prepare a mixed aqueous solution of $Bi(NO_3)_3 \cdot 5H_2O$ and $RuCl_3 \cdot 3H_2O$. Then, a 2 mol %/1 NaOH aqueous solution was added to this mixed aqueous solution. The bath temperature at this time was set at 75° C., and the solution was stirred under oxygen bubbling. While the solution containing a precipitate generated by this operation was maintained at 85° C., a portion of the moisture was evaporated to form a paste. This paste was transferred to an evaporating dish and heated to 120° C. This paste was dried while maintained in the state for 12 hours to obtain a dried product of the paste (precursor). Then, as a second step, this dried product was pulverized in a mortar then heated under an air atmosphere to 600° C., calcined while maintained for 1 hour to obtain a calcined product. The calcined product obtained was washed with distilled water at 70° C., then filtered with suction, and dried. This resulted a pyrochlore-type bismuth-ruthenium oxide.

The bismuth-ruthenium oxide obtained was pulverized using a mortar to obtain a bismuth-ruthenium oxide powder, which was an assembly of particles having a predetermined particle size. As a result of observation on a secondary electron image of this bismuth-ruthenium oxide powder obtained using a scanning electron microscope, the bismuth-ruthenium oxide had a particle size of 0.1 μm or less.

Subsequently, as a third step, 2 g of the bismuth-ruthenium oxide powder, along with 40 ml of nitric acid aqueous solution, was placed in the stirring tank of a stirrer and stirred for 6 hours while the temperature of the nitric acid aqueous solution was maintained at 25° C. Here, the concentration of the nitric acid aqueous solution was set at 2 mol %/1.

After the stirring was completed, the bismuth-ruthenium oxide powder was taken out from the nitric acid aqueous solution by filtering with suction. The bismuth-ruthenium oxide powder taken out was washed with 1 liter of ion exchanged water heated to 70° C. After washing, the bismuth-ruthenium oxide powder was placed in a reduced pressure vessel at room temperature of 25° C. and dried while maintained under a reduced pressure environment for 12 hours.

In the manner as mentioned above, obtained was a bismuth-ruthenium oxide powder subjected to a nitric acid-treatment, that is, a catalyst for an air secondary battery.

(2) Production of Air Electrode

The bismuth-ruthenium oxide powder subjected to the nitric acid treatment, a nickel powder, a polytetrafluoroethylene (PTFE) dispersion, and ion exchanged water were uniformly mixed at a mass ratio of 56.5:16.1:16.1:11.3 to produce an air electrode mixture paste.

The air electrode mixture paste obtained was shaped into a sheet form. The air electrode mixture paste in a sheet form was pressure-bonded by a press onto nickel mesh having a mesh number of 60, a wire diameter of 0.08 mm, and an opening ratio of 60%.

The air electrode mixture pressure-bonded on the nickel mesh was heated to 340° C. under a nitrogen gas atmosphere and calcined while maintained at this temperature for 13 minutes. After the calcination, the calcined product was cut to a size of 40 mm in length and 40 mm in width to thereby obtain an air electrode 14. The air electrode 14 had a thickness of 0.20 mm (3) Production of Negative Electrode Metal materials of Nd, Mg, Ni, and Al were mixed at a predetermined molar ratio, then introduced in a high-frequency induction melting furnace, and melted under an argon gas atmosphere. The melted metal obtained was poured into a mold and cooled to room temperature of 25° C. to produce an ingot.

Subsequently, this ingot was subjected to a thermal treatment by being maintained under an argon gas atmosphere at a temperature of 1000° C. for 10 hours. Then, the ingot was pulverized mechanically under an argon gas atmosphere to obtain a rare earth-Mg—Ni-based hydrogen storage alloy powder. The volume average particle size (MV) of the rare earth-Mg—Ni-based hydrogen storage alloy powder obtained was measured by a laser diffraction-scattering particle size distribution analyzer. As a result, the volume average particle size (MV) was 60 μm.

The composition of this hydrogen storage alloy powder was analyzed by inductively coupled high-frequency plasma spectroscopy (ICP) to find that the composition was $Nd_{0.89}Mg_{0.11}Ni_{3.33}Al_{0.17}$.

To 100 parts by mass of the hydrogen storage alloy powder obtained were added 0.2 parts by mass of a sodium polyacrylate powder, 0.04 parts by mass of a carboxymethyl cellulose powder, 3.0 parts by mass of a dispersion of styrene butadiene rubber, 0.5 parts by mass of a carbon black powder, and 22.4 parts by mass of water, and the mixture was kneaded under an environment of 25° C. to prepare a negative electrode mixture paste.

This negative electrode mixture paste was packed into a foam nickel sheet having an areal density (basis weight) of about 250 g/m² and a thickness of about 0.6 mm and dried to obtain a foam nickel sheet packed with the negative electrode mixture. The sheet obtained was rolled to increase the alloy content per volume, and cut to a size of 40 mm in length and 40 mm in width to thereby obtain a negative electrode 12. The negative electrode 12 had a thickness of 0.25 mm.

Next, the negative electrode 12 obtained was subjected to an activation treatment. The procedure of this activation treatment is shown below.

First, a common sintered nickel hydroxide positive electrode was provided. Note that, as this nickel hydroxide positive electrode, provided was one having a positive electrode capacity sufficiently larger than the negative electrode capacity of the negative electrode 12. Then, this nickel hydroxide positive electrode and the negative electrode 12 obtained were stacked with a separator formed of polyethylene non-woven fabric interposed therebetween to form an electrode group for an activation treatment. This electrode group for an activation treatment, along with a predetermined amount of an alkali electrolyte solution, was accommodated in a container made of an acrylic resin. Thereby, a single electrode cell for a nickel hydride secondary battery was formed.

As an initial charge and discharge operation, this single electrode cell was left to stand under an environment at a temperature of 25° C. for 5 hours, then charged at 0.1 It for 14 hours, and then discharged at 0.5 It until the battery voltage reached 0.70 V. Next, as a second charge and discharge operation, under an environment at a temperature of 25° C., the single electrode cell, after left to stand for 5 hours, was charged at 0.5 It for 2.8 hours and then discharged at 0.5 It until the battery voltage reached 0.70 V. The second charge and discharge operation described above was taken as one cycle. In the second and later operations, the negative electrode 12 was subjected to an activation treatment by performing this charge and discharge cycle in a plurality of times. In each charge and discharge cycle, the capacity of the single electrode cell was determined. Then, the maximum value of the capacities obtained was taken as the capacity of the negative electrode. The negative electrode had a capacity of 700 mAh.

Thereafter, the single electrode cell was charged at 0.5 It for 2.8 hours and then, the negative electrode 12 was removed from the single electrode cell. In this manner, obtained was a negative electrode 12 subjected to the activation treatment and charging.

(4) Production of Air Hydrogen Secondary Battery

The air electrode 14 and the negative electrode 12 obtained were stacked with a separator 16 sandwiched therebetween to produce an electrode group 6. The separator 16 used for the production of this electrode group 6 was formed of non-woven fabric made of polypropylene fiber having a sulfone group and had a thickness of 0.1 mm (basis weight 53 g/m$^2$).

Subsequently, an accommodating bag for evaluation 18 was provided, and the electrode group 6 described above was accommodated into this accommodating bag 18. In this accommodating bag 18, which is a bag made of polyethylene, for example, an insertion/ejection port having a fastener (not shown) is provided in a portion thereof, and an opening 20 of 30 mm in length and 30 mm in width is provided in another portion thereof.

The electrode group 6 was accommodated through the insertion/ejection port described above in the accommodating bag 18. In the accommodating bag 18, a separator 17, different from the separator 16, was disposed below the electrode group 6 (below the negative electrode 12). Additionally, carbon non-woven fabric (45 mm in length, 45 mm in width, and 0.2 mm in thickness) 24 subjected to a water repellent treatment with PTFE was disposed above the electrode group 6 (above the air electrode 14). Then, the peripheral portion of the opening 20 of the accommodating bag 18 was brought into a close contact with the carbon non-woven fabric 24, and only the carbon non-woven fabric 24 was exposed through the opening 20 from the accommodating bag 18. Then, 10 ml of an alkali electrolyte solution (5 mol %/1 KOH aqueous solution) was poured through the insertion/ejection port. Thereafter, the fastener of the insertion/ejection port was closed, and the inside of the accommodating bag 18 was defoamed under reduced pressure.

The electrode group 6 accommodated in the accommodating bag 18 in the state described above was sandwiched along with the accommodating bag 18 between the top plate 8 and the bottom plate 10. At this time, a negative electrode side buffer plate 22 was interposed between the accommodating bag 18 and the bottom plate 10. Then, the top plate 8 and the bottom plate 10 were connected and fixed with connectors 34 and 36. Here, the top plate 8 is a plate material made of an acryl resin, having a venting passage 26, the ends of which are open to the atmosphere. This venting passage 26 entirely takes one serpentine shape having a width of 2 mm, an end width of 2.5 mm, a depth of 1 mm, and a peak width of 1 mm. This venting passage 26 faces the carbon non-woven fabric 24 via the opening 20. The bottom plate 10 is a plate material made of an acryl resin, having the same size as the top plate 8 and having no venting passage.

In the manner described above, a battery 2 was produced, as shown in FIG. 1. The battery 2 obtained was left to stand under an environment at a temperature of 25° C. for 3 hours to allow the alkali electrolyte solution to permeate the electrode group 6.

Note that an air electrode lead 42 is electrically connected to the air electrode 14 and a negative electrode lead 44 is electrically connected to the negative electrode 12. The air electrode lead 42 and negative electrode lead 44 are appropriately extend from the inner side to the outside of the accommodating bag 18 while air-tightness and water-tightness of the accommodating bag 18 are maintained. Additionally, an air electrode terminal 46 is attached to the tip of the air electrode lead 42, and a negative electrode terminal 48 is attached to the tip of the negative electrode lead 44.

The battery 2 obtained was discharged via the air electrode terminal 46 and the negative electrode terminal 48 under a condition where the current value per unit area of the air electrode 14 reached 20 mA/cm$^2$ to provide a battery 2 before property evaluation.

Comparative Example 1

An air hydrogen secondary battery was produced in the same manner as in Example 1 except that no nitric acid treatment was conducted on the bismuth-ruthenium oxide and the bismuth-ruthenium oxide not subjected to a nitric acid treatment was used.

Figure 2:
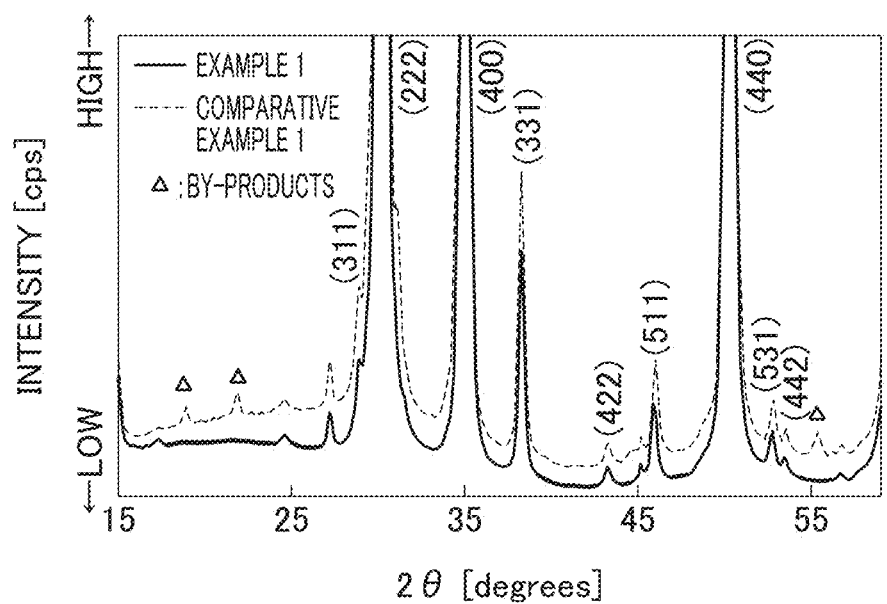
FIG. 2 is a graph showing X-ray diffraction profiles of a bismuth-ruthenium oxide powder of Example 1 and a bismuth-ruthenium oxide powder of Comparative Example 1.

2. Evaluation of Catalyst for Air Secondary Battery and Air Hydrogen Secondary Battery (1) X-ray Diffraction (XRD) Analysis of Catalyst for Air Secondary Battery (i) Analysis Conditions A portion of the bismuth-ruthenium oxide powder subjected to the nitric acid treatment in Example 1 and a portion of the bismuth-ruthenium oxide powder not subjected to the nitric acid treatment in Comparative Example 1 were reserved in advance as analysis samples. The analysis samples were subjected to an X-ray diffraction (XRD) analysis. A parallel beam X-ray diffraction apparatus was used for the analysis. The analysis conditions here included an X-ray source of CuKα, a tube voltage of 40 kV, a tube current of 15 mA, a scan speed of 5 degrees/min, and a step width of 0.02 degrees. The profiles of the analysis results are shown in FIG. 2.

(ii) Discussion

In the profiles of the analysis results, the peak of portions marked with a triangle are the peaks of by-products. From the profiles of the analysis results, it can be seen that, from the catalyst for an air secondary battery according to Comparative Example 1, which was not subjected to the nitric acid treatment, by-products were generated.

In contrast, in Example 1, the peaks of by-products disappeared. The catalyst for an air secondary battery of Example 1 was subjected to the nitric acid treatment, and it is conceived that this nitric acid treatment removed by-products having high crystallinity. Also in Example 1, the background intensity has been lowered entirely compared with Comparative Example 1, and it is conceived that by-products seeming to be amorphous have been removed simultaneously.

(2) Composition Analysis of Catalyst for Air Secondary Battery (i) Analysis Conditions A portion of the bismuth-ruthenium oxide powder subjected to the nitric acid treatment in Example 1 and a portion of the bismuth-ruthenium oxide powder not subjected to the nitric acid treatment in Comparative Example 1 were reserved in advance as analysis samples. The analysis samples were observed with a scanning electron microscope (SEM), and simultaneously, the composition of the samples was analyzed using an energy dispersive X-ray spectrometer (EDS).

Figure 3:
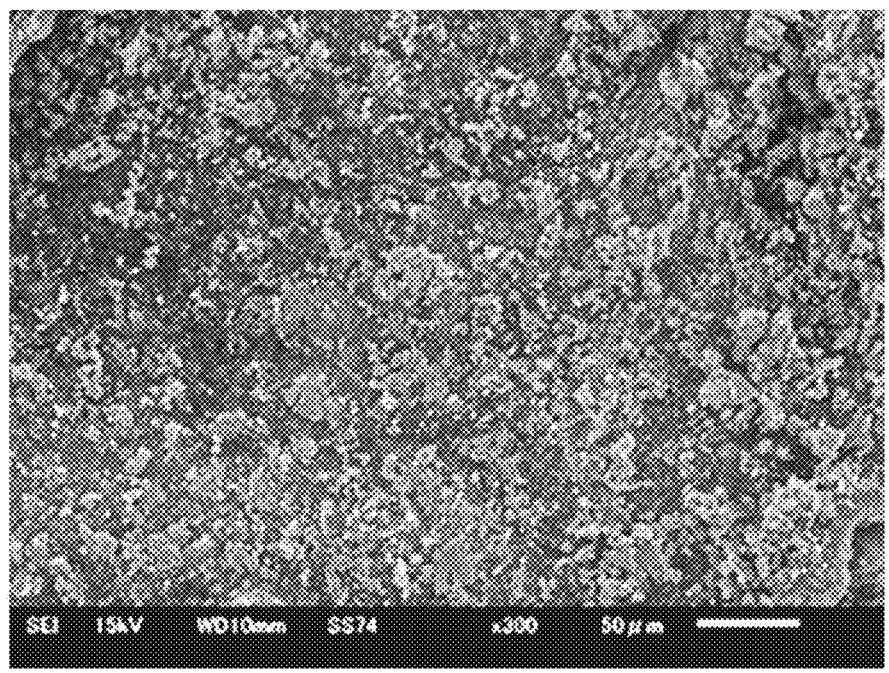
FIG. 3 is a SEM image photograph of the bismuth-ruthenium oxide of Example 1 (magnification: 300 times).
Figure 4:
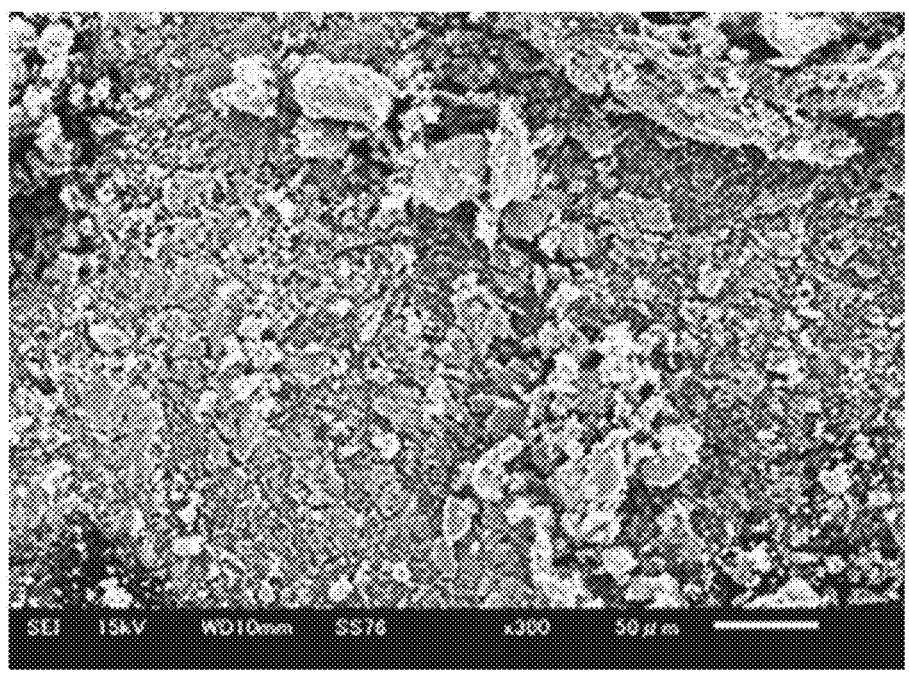
FIG. 4 is a SEM image photograph of the bismuth-ruthenium oxide of Comparative Example 1 (magnification: 300 times).

A SEM image (magnification: 300 times) photograph of the analysis result of Example 1 is shown in FIG. 3, and a SEM image (magnification: 300 times) photograph of the analysis result of Comparative Example 1 is shown in FIG. 4. From the SEM images of the analysis results, a composition analysis was conducted based on area mapping. The composition of elements detected with the composition analysis is shown in Table 1. The ratio of the amount of bismuth to the amount of ruthenium (Bi/Ru) was also shown.

TABLE 1

|  | Composition of elements detected [number of atoms %] | | | | |
|---|---|---|---|---|---|
|  | O | Na | Ru | Bi | Bi/Ru |
| Example 1 | 57.85 | 4.72 | 20.26 | 17.17 | 0.85 |
| Comparative Example 1 | 48.70 | 4.55 | 24.42 | 22.33 | 0.91 |

(ii) Discussion

The ratio of the amount of bismuth to the amount of ruthenium (Bi/Ru) in the catalyst for an air secondary battery of Example 1 was 0.85. Meanwhile, the amount of bismuth to the amount of ruthenium (Bi/Ru) in the catalyst for an air secondary battery of Comparative Example 1 was 0.91. That is, the ratio of the amount of bismuth to the amount of ruthenium in Example 1 is lower than that in Comparative Example 1. It is conceived that this resulted from removal of the by-products by the nitric acid treatment.

From those described above, it can be seen that the Bi/Ru value is 0.91 when the bismuth-ruthenium oxide is not subjected to the nitric acid treatment, and when the bismuth-ruthenium oxide is subjected to the nitric acid treatment, the by-products are removed, and the Bi/Ru value falls below 0.91.

(3) Property Evaluation of Air Hydrogen Secondary Battery (i) Analysis Conditions Each of the batteries before property evaluation according to Example 1 and Comparative Example 1, under an environment at a temperature of 25° C., after left to stand for three hours, was charged for 2.2 hours at a charging current at 180 mA, and thereafter, left to stand for 20 minutes.

Then, the battery after left to stand for 20 minutes, under the same environment, was discharged at a discharging current at 180 mA until the battery voltage reached 0.4 V, and left to stand for 10 minutes.

The charging and discharging cycle described above was taken as one cycle, and 20 cycles were repeated.

Note that 13 ml/minute of air was continuously allowed to flow through the venting passage 26 irrespective of charging and discharging.

Figure 5:
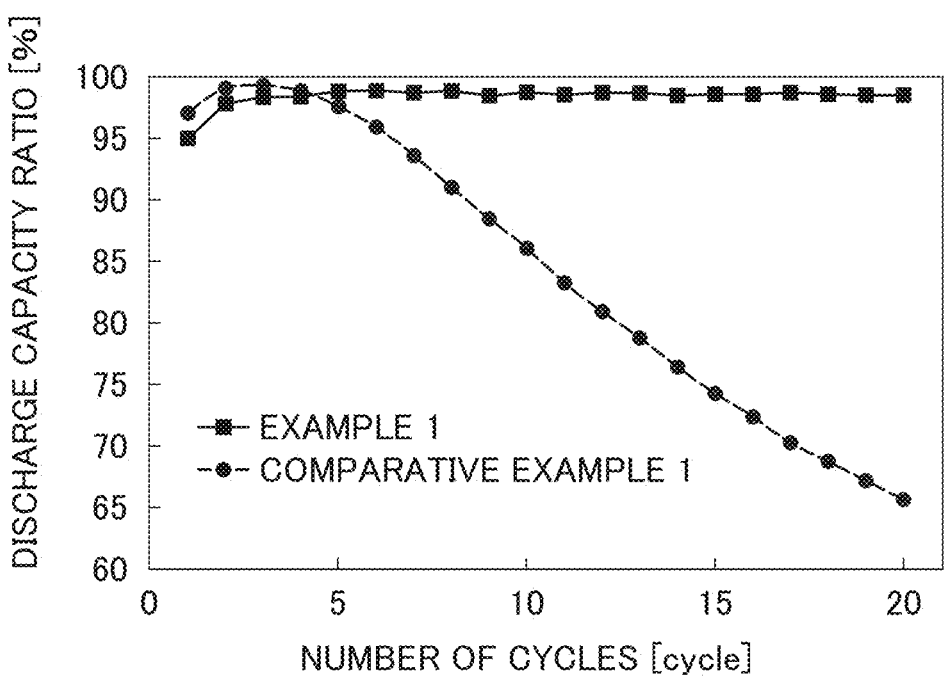
FIG. 5 is a graph showing the relationship between the discharge capacity ratio and the number of cycles.

The charge capacity on charging and the discharge capacity on discharging were determined in each cycle. From the charge capacity and the discharge capacity obtained, the percentage of the discharge capacity to the charge capacity in each cycle was determined as the discharge capacity ratio. Then, the variation in the discharge capacity was determined from the relationship between the discharge capacity ratio and the number of cycles. The results were shown in FIG. 5.

Figure 6:
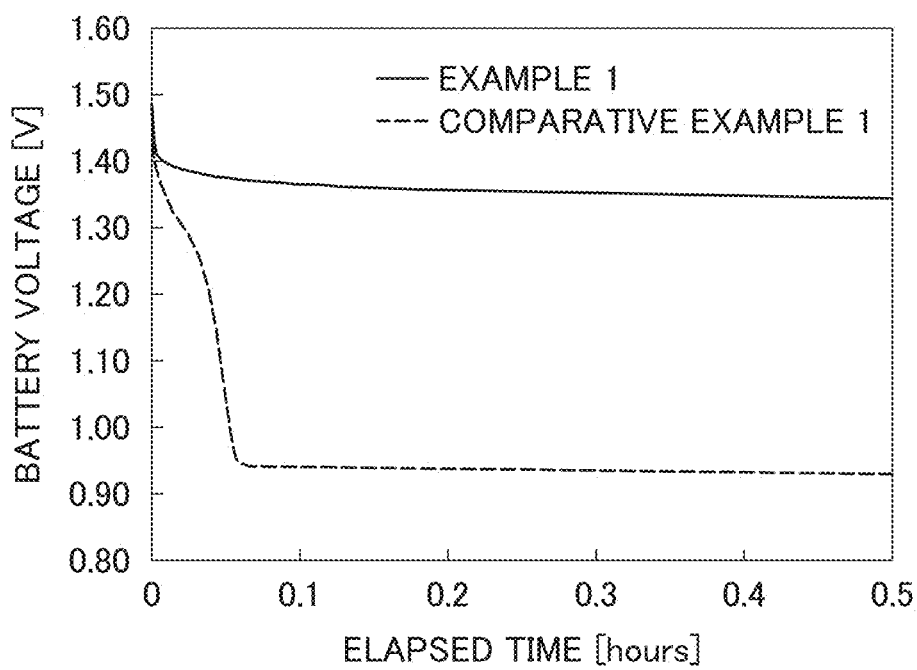
FIG. 6 is a graph showing the relationship between the battery voltage and the elapsed time at a pause after charging is finished.

Additionally, the relationship between the battery voltage and the elapsed time was determined in the pause state after the charge of the 20th cycle was conducted. From this relationship between the battery voltage and the elapsed time, the variation in the voltage was determined. The results were shown in FIG. 6.

(ii) Discussion

In the graph of the variation in the discharge capacity ratio according to the battery of Example 1, the discharge capacity ratio exhibits substantially constant values of the order of 98 to 99% and stable, even when the charge and discharge cycle proceeds. In other words, the amount discharged of the battery of Example 1 is substantially equal to the amount charged, and additionally, the state is maintained even when the charge and discharge cycle proceeds. In other words, self-discharging in the battery of Example 1 is kept low. Conceivably, this is because micro short-circuiting has not occurred in the battery of Example 1.

In contrast, in the graph of the variation in the discharge capacity ratio according to the battery of Comparative Example 1, the discharge capacity ratio decreases as the charge and discharge cycle proceeds. In other words, the amount discharged is lower than the amount charged in the battery of Comparative Example 1, and the battery is self-discharging. Conceivably, this is because micro short-circuiting has occurred in the battery of Comparative Example 1.

In the graph of the variation in the voltage according to the battery of Example 1, the value of the battery voltage lingers at of the order of 1.35 V and is stable with no sharp drop. Conceivably, this is because micro short-circuiting has not occurred in the battery of Example 1.

In contrast, in the graph of the variation in the voltage according to the battery of Comparative Example 1, the value of the battery voltage sharply drops immediately after the pause state is started. Conceivably, this is because micro short-circuiting has occurred in the battery of Comparative Example 1.

(4) X-Ray Diffraction (XRD) Analysis of Separator (i) Analysis Conditions

Figure 7:
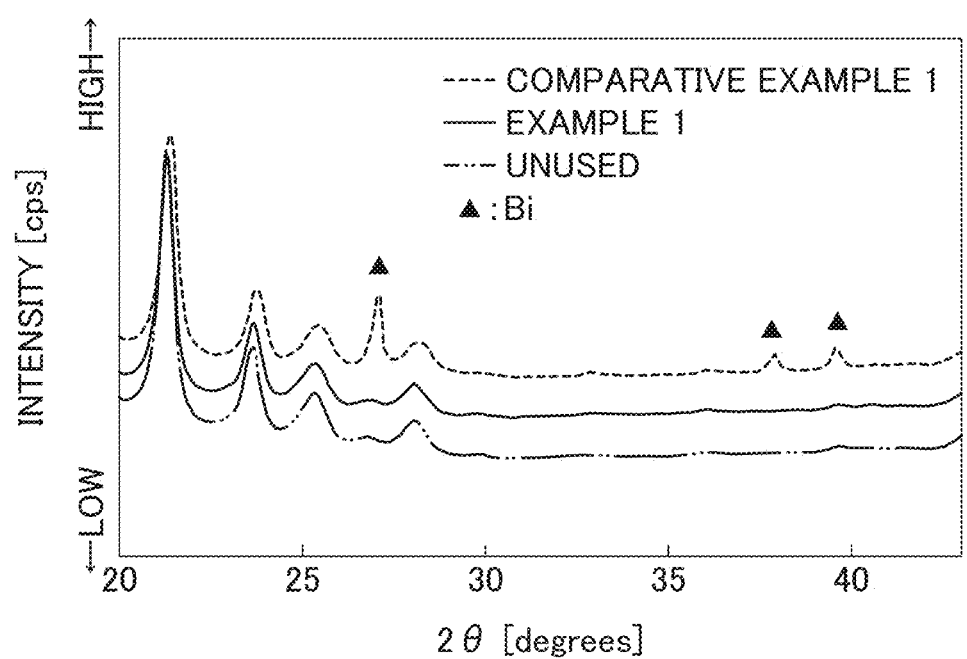
FIG. 7 is a graph showing X-ray diffraction profiles of the separator of Example 1, the separator of Comparative Example 1, and an unused separator.

The batteries of Example 1 and Comparative Example 1, after 20 cycles of charging and discharging were repeated in the property analysis of the air hydrogen secondary batteries described above, were disassembled, and the separators were removed. A portion was cut off from each of the separator according to Example 1 and the separator according to Comparative Example 1 to take analysis samples. The analysis samples obtained were subjected to an X-ray diffraction (XRD) analysis. A parallel beam X-ray diffraction apparatus was used for the analysis. The analysis conditions here included an X-ray source of CuKα, a tube voltage of 40 kV, a tube current of 15 mA, a scan speed of 1 degrees/min, and a step width of 0.01 degrees. The profiles of the analysis results is shown in FIG. 7.

Additionally, an analysis sample of an unused separator was prepared and subjected to an X-ray diffraction (XRD)

analysis under the same conditions as described above. The profile of the analysis results obtained is also shown in FIG. 7.

(ii) Discussion

The profile of the separator according to Comparative Example 1 has peaks at portions marked with a black solid triangle. These peaks correspond to the peaks of bismuth. In other words, it can be seen that bismuth is deposited on the separator according to Comparative Example 1. Thus, it is conceived that by-products remained in Comparative Example 1 not subjected to the nitric acid treatment, bismuth included in the by-products caused a dissolution and precipitation reaction due to the battery reaction, and the bismuth dendritically grew to extend into the separator. It is conceived that this bismuth extended into the separator is responsible for the micro short-circuiting.

The profile of the separator according to Example 1 has no peak at the portions marked with a black solid triangle. The profile of the unused separator substantially coincides with the profile of the separator of Example 1. In the separator of Example 1, the initial state is maintained even when charging and discharging are repeated. From those described above, it can be said that no bismuth is deposited on the separator according to Example 1. It is conceived that this is caused by removal of the by-products by the nitric acid treatment.

From those described above, it can be said that deposition of bismuth does not occur to thereby prevent micro short-circuiting from occurring as long as the by-products are removed by the nitric acid treatment. When the bismuth-ruthenium oxide is subjected to the nitric acid treatment and the Bi/Ru value reaches 0.90 or less, it is conceived that the by-products are removed from the oxide such that an effect of preventing deposition of bismuth is achieved. For this reason, it is conceived that the bismuth-ruthenium oxide is subjected to the nitric acid treatment and the value of Bi/Ru is preferably 0.90 or less and as low as possible. However, when the value of Bi/Ru is less than 0.80, the crystalline structure of the bismuth-ruthenium oxide may change. Thus, it is conceived that the value of Bi/Ru is more preferably 0.90 or less and 0.80 or more.

Note that the present disclosure is not limited to the embodiments described above. Examples of the catalyst for an air secondary battery include the transition element oxides in addition to the bismuth-ruthenium oxide. According to the present disclosure, applying the acid treatment to the transition element oxide enables removal of by-products generated in the production process of the transition element oxide. Then, there can be obtained a catalyst for an air secondary battery from which the by-products have been removed, and thus it is possible to prevent occurrence of a problem of dendritic growth of the transition element in the by-products.

<Aspects of Present Disclosure>

A first aspect of the present disclosure is a method for producing a catalyst for an air secondary battery for use in the air electrode of the air secondary battery, the method including a precursor preparation step of preparing a pyrochlore-type oxide precursor, a calcination step of calcining the precursor to form a pyrochlore-type oxide, and an acid treatment step of immersing the pyrochlore-type oxide obtained from the calcination step in an acidic aqueous solution to apply an acid treatment.

A second aspect of the present disclosure is the method for producing a catalyst for an air secondary battery according to the first aspect of the present disclosure described above, wherein the pyrochlore-type oxide is a pyrochlore-type transition element oxide having a composition represented by the general formula: $A_{2-x}B_{2-y}O_{7-z}$, wherein x, y, and z each represent a numerical value of 0 or more and 1 or less, A represents at least one element selected from Bi, Pb, Tb, La, Ce, Pr, Nd, Pm, Sm, Eu, Gd, Dy, Ho, Er, Tm, Yb, Lu, Mn, Y, and Zn, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo.

A third aspect of the present disclosure is the method for producing a catalyst for an air secondary battery according to the first aspect or the second aspect of the present disclosure described above, wherein the acidic aqueous solution is any of a nitric acid aqueous solution, a hydrochloric acid aqueous solution, and a sulfuric acid aqueous solution.

A fourth aspect of the present disclosure is the method for producing a catalyst for an air secondary battery according to the second aspect or the third aspect of the present disclosure described above, wherein the pyrochlore-type transition element oxide is a pyrochlore-type bismuth-ruthenium oxide.

A fifth aspect of the present disclosure is the method for producing a catalyst for an air secondary battery according to the fourth aspect of the present disclosure described above, wherein the acid treatment is applied such that, when X represents the amount of bismuth contained in the bismuth-ruthenium oxide and Y represents the amount of ruthenium contained in the bismuth-ruthenium oxide, the value of X/Y, which is the ratio of the amount of bismuth to the amount of ruthenium, is 0.90 or less.

A sixth aspect of the present disclosure is the method for producing a catalyst for an air secondary battery according to the fifth aspect of the present disclosure described above, wherein the acid treatment is applied such that the value of X/Y, which is the ratio of the amount of bismuth to the amount of ruthenium, is 0.80 or more.

A seventh aspect of the present disclosure is a method for producing an air secondary battery, including an air electrode production step of allowing an air electrode substrate to carry an air electrode mixture including a catalyst for an air secondary battery to produce an air electrode, a negative electrode production step of allowing a negative electrode substrate to carry a negative electrode mixture to produce a negative electrode, an electrode group formation step of stacking the air electrode on the negative electrode with a separator therebetween to form an electrode group, and an accommodation step of accommodating the electrode group along with an alkali electrolyte solution into a container, wherein the catalyst for an air secondary battery is produced by the method for producing a catalyst for an air secondary battery according any of the first aspect to the sixth aspect of the present disclosure described above.

An eighth aspect of the present disclosure is the method for producing an air secondary battery according to the seventh aspect of the present disclosure described above, wherein the negative electrode production step further includes a process of allowing the negative electrode mixture to contain a hydrogen storage alloy.

A ninth aspect of the present disclosure is a catalyst for an air secondary battery for use in the air electrode of the air secondary battery, including a pyrochlore-type oxide that has been subjected to an acid treatment of immersion in an acidic aqueous solution and from which by-products generated in the production process have been removed.

A tenth aspect of the present disclosure is the catalyst for an air secondary battery according to the ninth aspect of the present disclosure described above, wherein the pyrochlore-type oxide is a pyrochlore-type transition element oxide having a composition represented by the general formula: $A_{2-x}B_{2-y}O_{7-z}$, wherein x, y, and z each represent a numerical value of 0 or more and 1 or less, A represents at least one element selected from Bi, Pb, Tb, La, Ce, Pr, Nd, Pm, Sm, Eu, Gd, Dy, Ho, Er, Tm, Yb, Lu, Mn, Y, and Zn, and B represents at least one element selected from Ru, Ir, Si, Ge, Ta, Sn, Hf, Zr, Ti, Nb, V, Sb, Rh, Cr, Re, Sc, Co, Cu, In, Ga, Cd, Fe, Ni, W, and Mo.

An eleventh aspect of the present disclosure is the catalyst for an air secondary battery according to the tenth aspect of the present disclosure described above, wherein the pyrochlore-type transition element oxide is a bismuth-ruthenium oxide.

A twelfth aspect of the present disclosure is the catalyst for an air secondary battery according to the eleventh aspect of the present disclosure described above, wherein, in the bismuth-ruthenium oxide, when X represents the amount of bismuth contained in the bismuth-ruthenium oxide and Y represents the amount of ruthenium contained in the bismuth-ruthenium oxide, the value of X/Y, which is the ratio of the amount of bismuth to the amount of ruthenium, is 0.90 or less.

A thirteenth aspect of the present disclosure is the catalyst for an air secondary battery according to the twelfth aspect of the present disclosure described above, wherein the value of X/Y, which is the ratio of the amount of bismuth to the amount of ruthenium, is 0.80 or more.

A fourteenth aspect of the present disclosure is an air secondary battery, including an electrode group including an air electrode and a negative electrode stacked with a separator therebetween, and a container accommodating the electrode group along with an alkali electrolyte, wherein the air electrode includes the catalyst for an air secondary battery according to any of the ninth aspect to the eleventh aspect of the present disclosure described above.

A fifteenth aspect of the present disclosure is air secondary battery according to the fourteenth aspect of the present disclosure described above, wherein the negative electrode includes a hydrogen storage alloy.

EXPLANATION OF REFERENCE SIGNS 2 battery (air hydrogen secondary battery)
4 container
6 electrode group
8 top plate
10 bottom plate
12 negative electrode
14 air electrode (positive electrode)
16 separator
24 carbon non-woven fabric
26 venting passage

The invention claimed is:

1. A method for producing a catalyst for an air secondary battery for use in an air electrode of the air secondary battery, the method comprising:
 a precursor preparation step of preparing a pyrochlore-type oxide precursor,
 a calcination step of calcining the pyrochlore-type oxide precursor to form a pyrochlore-type oxide, and
 an acid treatment step of immersing the pyrochlore-type oxide obtained from the calcination step in an acidic aqueous solution to apply an acid treatment;
 wherein the pyrochlore-type oxide is a pyrochlore-type bismuth-ruthenium oxide.

2. The method for producing a catalyst for an air secondary battery according to claim 1, wherein the pyrochlore-type bismuth-ruthenium oxide has a composition represented by the general formula: $Bi_{2-X}Ru_{2-Y}O_{7-Z}$, wherein X, Y, and Z each represent a numerical value of 0 or more and 1 or less.

3. The method for producing a catalyst for an air secondary battery according to claim 1, wherein the acidic aqueous solution is any of a nitric acid aqueous solution, a hydrochloric acid aqueous solution, or a sulfuric acid aqueous solution.

4. The method for producing a catalyst for an air secondary battery according to claim 2, wherein the acid treatment is applied such that, when X represents the amount of bismuth contained in the bismuth-ruthenium oxide and Y represents the amount of ruthenium contained in the bismuth-ruthenium oxide, the value of X/Y, which is the ratio of the amount of bismuth to the amount of ruthenium, is 0.90 or less.

5. The method for producing a catalyst for an air secondary battery according to claim 4, wherein the acid treatment is applied such that the value of X/Y, which is the ratio of the amount of bismuth to the amount of ruthenium, is 0.80 or more and 0.90 or less.

6. A method for producing an air secondary battery comprising:
 an air electrode production step of allowing an air electrode substrate to carry an air electrode mixture comprising a catalyst for an air secondary battery to produce an air electrode,
 a negative electrode production step of allowing a negative electrode substrate to carry a negative electrode mixture to produce a negative electrode,
 an electrode group formation step of stacking the air electrode on the negative electrode with a separator therebetween to form an electrode group, and
 an accommodation step of accommodating the electrode group along with an alkali electrolyte solution into a container,
 wherein the catalyst for an air secondary battery is produced by the method for producing a catalyst for an air secondary battery according to claim 1.

7. The method for producing an air secondary battery according to claim 6, wherein the negative electrode production step further comprises a process of allowing the negative electrode mixture to contain a hydrogen storage alloy.

8. A catalyst for an air secondary battery for use in an air electrode of the air secondary battery, comprising a pyrochlore-type bismuth-ruthenium oxide that has been subjected to an acid treatment of immersion in an acidic aqueous solution and from which by-products generated in the production process have been removed.

9. The catalyst for an air secondary battery according to claim 8, wherein the pyrochlore-type bismuth-ruthenium oxide has a composition represented by the general formula: $Bi_{2-X}Ru_{2-Y}O_{7-Z}$, wherein X, Y, and Z each represent a numerical value of 0 or more and 1 or less.

10. The catalyst for an air secondary battery according to claim 9, wherein, in the bismuth-ruthenium oxide, when X represents the amount of bismuth contained in the bismuth-ruthenium oxide and Y represents the amount of ruthenium contained in the bismuth-ruthenium oxide, the value of X/Y, which is the ratio of the amount of bismuth to the amount of ruthenium, is 0.90 or less.

11. The catalyst for an air secondary battery according to claim 10, wherein the value of X/Y, which is the ratio of the amount of bismuth to the amount of ruthenium, is 0.80 or more and 0.90 or less.

12. An air secondary battery comprising:
    an electrode group comprising an air electrode and a negative electrode stacked with a separator therebetween, and
    a container accommodating the electrode group along with an alkali electrolyte, wherein,
    the air electrode comprises the catalyst for an air secondary battery according to claim 8.

13. The air secondary battery according to claim 12, wherein the negative electrode comprises a hydrogen storage alloy.

\* \* \* \* \*